(12) United States Patent
Filho

(10) Patent No.: US 8,622,342 B2
(45) Date of Patent: Jan. 7, 2014

(54) ON-BOARD AIRCRAFT AUXILIARY POWER SYSTEMS HAVING DUAL AUXILIARY POWER UNITS

(75) Inventor: Aldemiro Lorenzini Filho, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 311 days.

(21) Appl. No.: 13/162,931

(22) Filed: Jun. 17, 2011

(65) Prior Publication Data
US 2012/0318913 A1 Dec. 20, 2012

(51) Int. Cl.
*B64D 41/00* (2006.01)
(52) U.S. Cl.
USPC .............................................. 244/58; 244/55
(58) Field of Classification Search
USPC .............. 244/53 R, 54, 55, 58, 53 B; 60/280
See application file for complete search history.

(56) References Cited

U.S. PATENT DOCUMENTS

| | | | |
|---|---|---|---|
| 2,777,301 A | 1/1957 | Kuhn | |
| 4,077,202 A | 3/1978 | Schutze | |
| 4,759,178 A | 7/1988 | Joy | |
| 5,480,107 A * | 1/1996 | Bacon | 244/55 |
| 5,855,340 A * | 1/1999 | Bacon | 244/53 R |
| 6,247,668 B1 * | 6/2001 | Reysa et al. | 244/58 |
| 6,450,447 B1 | 9/2002 | Konrad et al. | |
| 8,286,435 B2 * | 10/2012 | Rensch | 60/802 |
| 2003/0146344 A1 * | 8/2003 | Saito et al. | 244/55 |
| 2006/0054739 A1 * | 3/2006 | Perez et al. | 244/55 |

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

Aircraft are provided with a pair of auxiliary power units (APUs) adjacently mounted in parallel relative to one another within the tail cone section of the aircraft's fuselage. In some embodiments, the APUs are mounted generally vertically adjacent to one another. Alternatively, the APUs may be mounted generally horizontally adjacent to one another. The aircraft fuselage may include a pair of downwardly and outwardly oriented strakes adjacent the tail cone having lower edges which establish a maximum take-off pitch angle of the fuselage and define a spatial zone therebetween. The APUs are positioned within such a spatial zone defined between the strakes so that the maximum take-off pitch angle is not required to be changed when modifying an existing single APU aircraft with dual APUs.

13 Claims, 4 Drawing Sheets

ON-BOARD AIRCRAFT AUXILIARY POWER SYSTEMS HAVING DUAL AUXILIARY POWER UNITS

FIELD

The disclosed embodiments herein relate to on-board auxiliary power systems for aircraft in which dual auxiliary power units (APUs) are provided in a tail cone of the aircraft and operate in parallel so as to provide enhanced on-board electrical and/or pneumatic power.

BACKGROUND

Existing aircraft typically include two or more primary engines for propulsion. These aircraft also typically include at least one APU that provides electrical and/or pneumatic power in addition to or in lieu of the power provided by the primary engines. Accordingly, APUs can be used to provide power to the aircraft when the primary engines are not running, for example, when the aircraft is on the ground at an airport gate. The APUs can also provide temporary power to start the primary engines during normal operations, and/or temporary emergency power during an engine-out condition or other emergency condition during flight operations. Additionally, the APU can be used during flight to provide additional electrical and/or pneumatic power whenever the aircraft systems require an amount that exceeds the electrical and/or pneumatic power capability of the primary propulsion engines.

There are certain instances when an existing certificated aircraft undergoes a design change so as to adapt the airframe to an entirely different purpose for which it was originally intended. For example, a civil transport aircraft may be subsequently adapted to perform military or police surveillance missions. Such aircraft modifications to a baseline aircraft are colloquially termed "derivative aircraft". A derivative aircraft is thus often accompanied by a need to provide a substantial increase to the electrical power requirements due to the on-board presence of additional electrical and/or electronic equipment (e.g., on-board surveillance cameras, specialized radar, computers and associated equipment) carried by the aircraft to perform the missions for which it is designed. This increased electrical power requirement is often greater than the maximum electrical output for which the original APU was designed. The traditional solution to additional electrical power requirements is to replace the original APU with a larger APU having a correspondingly greater electrical power output capacity. However, such a larger APU will in turn usually require airframe space that is not readily available in the baseline (unmodified) aircraft, thereby requiring a major structural design change or even relocating the APU to another area within the airframe.

It would therefore be especially desirable to provide a solution to the problems described above whereby increased electrical power output could be provided to accommodate an increased power requirement of a baseline aircraft without the need to relocate and/or replace the existing APU. It is towards fulfilling such needs that the present invention is directed.

SUMMARY OF EXEMPLARY EMBODIMENTS

The present invention proposes the installation of two APUs in parallel in the aircraft tail cone to meet the increased electrical power demanded by equipment in a derivative aircraft. In preferred embodiments, the aircraft auxiliary power system is provided with dual APUs installed in parallel within the tail cone of the derivative aircraft with minimal impact on the original airframe design. In such a manner, the arrangement of the dual APUs can be accommodated within the tail cone of the derivative aircraft without substantial airframe modification of the baseline aircraft (e.g., without the need to modify the angle of takeoff in order to prevent tail strikes). As such, the necessary modifications in order to accommodate the dual APUs within the tail cone of the derivative aircraft can be achieved with minimal aerodynamic impact.

Therefore, according to preferred embodiments of the invention, an aircraft is provided which comprises a fuselage with a tail cone section, and a pair of auxiliary power units (APUs) adjacently mounted in parallel relative to one another within the tail cone section. In some embodiments, the APUs are mounted generally vertically adjacent to one another. A lower one of the APUs may thus be positioned forwardly of an upper one of the APUs.

According to other embodiments, the aircraft will comprise an upwardly aft-angled bulkhead support ring, and support arms interconnecting the upper one of the APUs to the support ring. To support the second APU a support plate may be provided so as to rigidly connect a lower portion of the support ring such that a forward end of the support plate is connected to the lower portion of the support ring. Certain embodiments will include a support plate having upwardly and rearwardly directed support arms attached to the lower one of the APUs. The support arms may have a forward end attached to the rearward frame member of the aircraft and a rearward end attached to the lower one of the APUs. A rearward frame member may extend downwardly and forwardly from a lower region of the support ring.

Certain embodiments may be provided with a firewall plate positioned between the APUs. The firewall plate may be in the form of a generally U-shaped plate structure having downwardly directed lateral edge regions. An upper frame member may be attached generally at a center of the firewall plate.

In some preferred embodiments, the aircraft fuselage will include a pair of downwardly and outwardly oriented strakes adjacent the tail cone having lower edges which establish a maximum take-off pitch angle of the fuselage. The strakes will thus define a spatial zone therebetween. The APUs are positioned within such a spatial zone defined between the strakes.

The structure of the strakes may be provided by a series of inverted U-shaped strake frame members positioned about a lower one of the APUs. Horizontal strake frame members may also be provided and attached to the inverted U-shaped strake frame members.

According to other embodiments, an aircraft is provided wherein the dual parallel APUs are mounted generally horizontally adjacent to one another.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
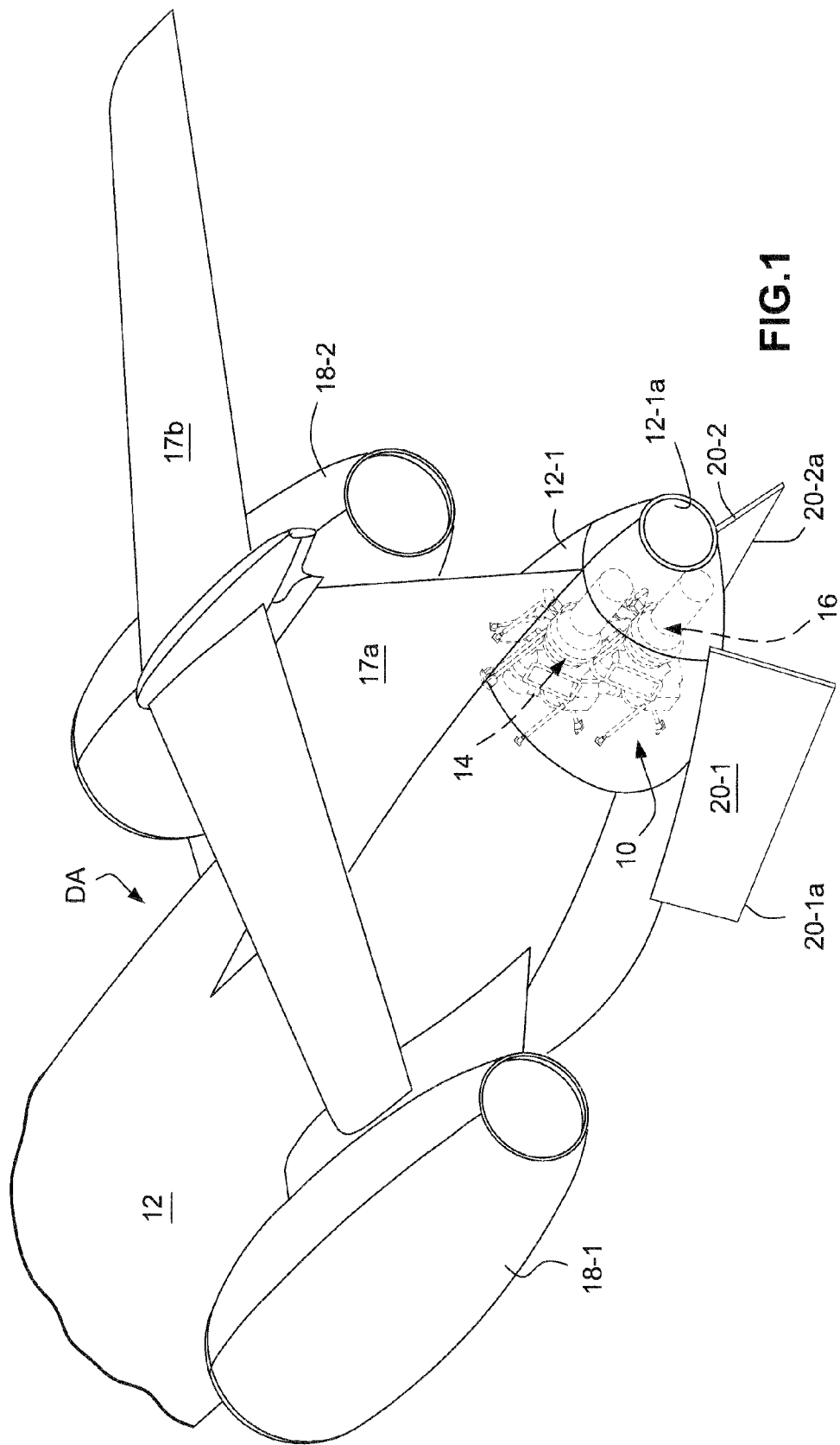
FIG. 1 depicts a schematically a rear perspective view of an exemplary derivative aircraft which embodies a dual parallel APU arrangement in accordance with one aspect of this invention.

Accompanying FIG. 1 depicts a rear perspective view of a derivative aircraft DA which is provided with an auxiliary power system 10 in accordance with an embodiment of the present invention. The derivative aircraft DA is depicted as including an elongate fuselage 12 terminating in a tail cone 12-1 in which the dual auxiliary power units (APUs) 14, 16 are positioned in a vertically oriented side-by-side arrangement.

As is conventional, the aircraft DA includes vertical horizontal stabilizers 17a, 17b, respectively. A pair of propulsion engines 18-1, 18-2 are mounted laterally near the tail cone 12-1 on port and starboard sides of the fuselage. It is to be understood, that the depiction of the propulsion engines 18-1, 18-2 near the tail cone 12-1 is exemplary only and thus the present invention may be embodiment in other aircraft configurations, e.g., where the propulsion engines are mounted under the port and starboard wings.

The derivative aircraft DA is also depicted in FIG. 1 as including port and starboard strakes 20-1, 20-2, respectively, oriented at the rear of the fuselage 12 adjacent to and laterally extending outwardly from the tail cone 12-1. As is known, the strakes 20-1, 20-2 are provided so as to enhance aerodynamic stability. The positioning of the strakes 20-1, 20-2 near the tail cone 12-1 however also establishes the maximum rotation angle of the aircraft during take-off. That is, in order to prevent a tail-strike during take-off (which in the embodiment shown would be contact between the takeoff runway and the lowermost edges 20-1a, 20-2a of the strakes 20-1, 20-2, respectively), the pitch (rotation) angle of the fuselage is limited by pilot input to the pitch-axis control surfaces of the aircraft DA to a maximum allowable angle of attack (AOA) until the aircraft is airborne and vertically separated from the runway surface by sufficient altitude.

The APUs 14, 16 are in and of themselves highly conventional JP-fueled turbine engines that turn a shaft associated with a generator and a compressor (not shown). The generator in turn generates electrical power while the compressor may be employed for other on-board systems (e.g., powering the aircraft's on-board hydraulics, air conditioning and the like). Most preferably, the APUs are connected to the fuel supply (typically in-wing mounted fuel cells) for the main propulsion engines 18-1, 18-2. When in use, the exhaust from the combustion of the fuel by the APUs is vented to ambient atmosphere by the exhaust opening 12-1a in the tail cone 12-1. By way of background, the APUs 14, 16 may embody the operational principles disclosed by U.S. Pat. Nos. 2,777, 301; 4,077,202; 4,759,178 and 6,450,447, the entire content of each being expressly incorporated hereinto by reference.

Figure 2:
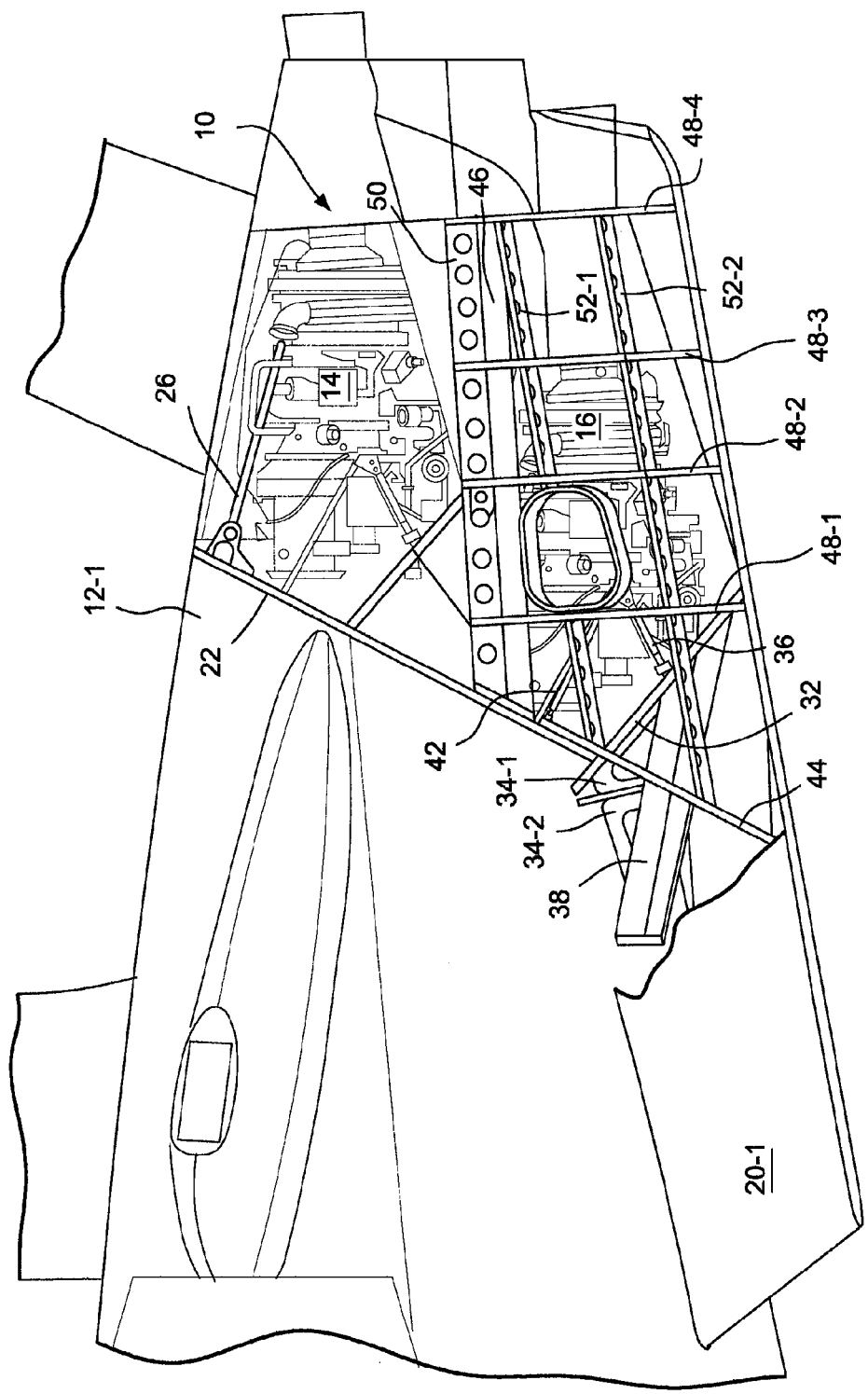
FIG. 2 is detailed side elevation view of the tail cone region of the aircraft depicted in FIG. 1 having the aircraft skin partly removed for visual ease.
Figure 3:
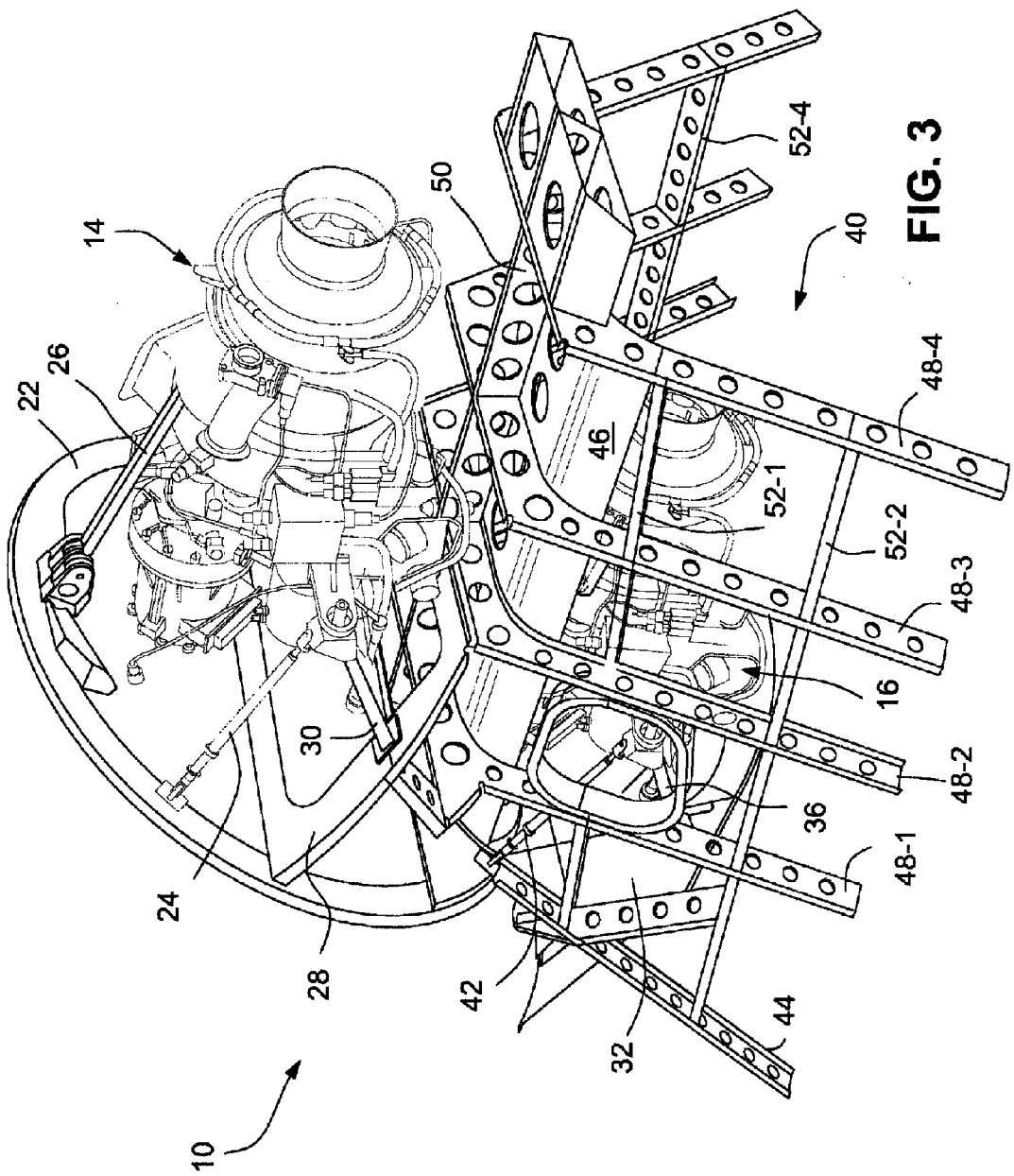
FIG. 3 is rear perspective view of the parallel APU arrangement depicted in FIG. 2 and its associated airframe support structure.

Accompanying FIGS. 2 and 3 depict in greater detail the manner in which the APUs 14, 16 are accommodated within the tail cone 12-1 of the aircraft DA. Specifically, the position of the APU 14 within the aircraft DA remains unchanged as compared to its position in the unmodified baseline aircraft. That is, the APU 14 is physically attached to and supported by an upwardly aft-angled bulkhead support ring 22 by means of support arms 24, 26. A lower support bracket 28 is attached to the support ring 22 and includes upwardly and rearwardly directed support arms 30 attached to the APU 14.

In order to accommodate the mounting of the second APU 16, a support plate 32 is attached to a lower portion of the support ring 22 and extends downwardly and rearwardly (relative to the aircraft fuselage 12) to a lowermost extent defined by the lower edges 20-1a, 20-2a of the strakes 20-1, 20-2. The support plate 32 includes upwardly and rearwardly directed support arms 36 attached to the APU 16. The downwardly and rearwardly directed support arm 42 has its forward end attached to the upper portion of the forward most frame 44 and the rearward end attached to the APU 16. The forward most frame 44 extends downwardly and forwardly from the lower region of the support ring 22 and to the lowermost extent defined by the lower edges 20-1a, 20-2a of the strakes 20-1, 20-2, respectively. A pair of forward support brackets 34-1, 34-2 are connected in series to a forward surface of the support plate 32, the latter also being rigidly connected to the support ring 22. The forward most support bracket 34-2 is connected to and carries a downwardly and rearwardly oriented support arm 38 having a terminal end fixed to a lower extent of the support plate 32.

As can be seen from FIGS. 2 and 3, therefore, the various support structures are entirely contained within a spatial zone 40 defined between the strakes 20-1, 20-2 and do not protrude downwardly beyond the plane defined by the lower edges 20-1a, 20-2a of the strakes 20-1, 20-2. Since the APUs are contained entirely within this spatial zone 40, the maximum pitch angle to prevent a tail strike during take-off that had been established during certification of the baseline aircraft remains unchanged. As such, the modification of the baseline aircraft to include the dual APUs 14, 16 in accordance with the present invention does not require modification of the derivative aircraft DA performance criteria.

As shown in FIG. 3, a fire wall plate 46 is positioned between APUs 14 and 16. The fire wall plate 46 is preferably in the form of an inverted U-shaped plate having downwardly directed lateral edge regions. A plurality of inverted U-shaped strake frame members 48-1 to 48-4 are positioned on and connected to the fire wall plate 46. These inverted U-shaped strake frame members 48-1 to 48-4 form part of the structure of the strakes 20-1 and 20-2. The upper frame 50 is positioned generally at the center of the fire wall plate 46 and is connected rigidly to the U-shaped strake frame members 48-1 to 48-4. The structure of the strakes 20-1 and 20-2 also comprises horizontal strake frame members 52-1 to 52-4 which are rigidly connected substantially perpendicular to the inverted U-shaped strake frame members 48-1 to 48-4.

Figure 4:
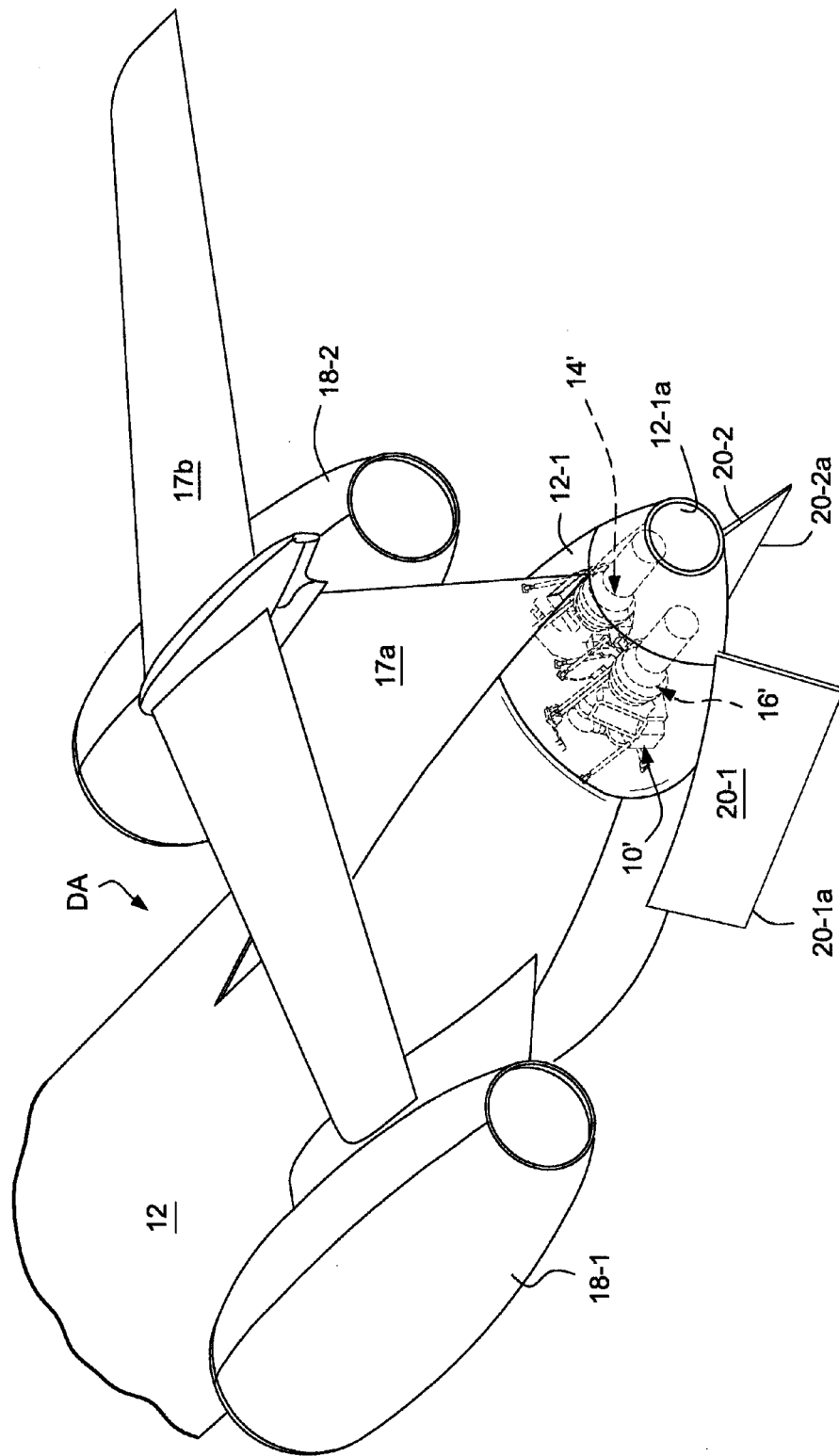
FIG. 4 depicts schematically a rear perspective view of another exemplary derivative aircraft which embodies a dual parallel APU arrangement in accordance with another aspect of this invention.

An alternative embodiment of an auxiliary power system 10' having dual parallel APUs 14', 16' is shown schematically in accompanying FIG. 4. As can be seen, unlike the embodiment described previously with respect to FIGS. 1-3 wherein the APUs 14, 16 are oriented vertically adjacent in a side-by-side relationship to one another with the lower APU being positioned forwardly of the upper APU 16 due to the angular positioning of the support ring 22 and other support structures as described previously, the APUs 14', 16' in the embodiment shown in FIG. 4 has both APUs adjacent to one another in a side-by-side relationship within a common horizontal plane. In the embodiment depicted in FIG. 4, relocation to the starboard side of the aircraft's centerline would be required for the original APU 14 supplied with the baseline aircraft so as to provide sufficient lateral space of the port side of the aircraft to accommodate the additional APU 16 in side-by-side relationship. A similar cantilevered mounting and support arrangement as with the original APU 14 could likewise be provided with the additional APU 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft comprising:
   a fuselage with a tail cone section,
   a pair of auxiliary power units (APUs) mounted in a parallel generally vertically adjacent manner relative to one another within the tail cone section such that a lower one of the APUs is positioned forwardly of an upper one of the APUs,
   an upwardly aft-angled bulkhead support ring, and support arms interconnecting the upper one of the APUs to the support ring, and
   a support plate rigidly connected to a lower portion of the support ring such that a forward end of the support plate is connected to a lower portion of the support ring.

2. An aircraft as in claim 1, wherein the support plate includes upwardly and rearwardly directed support arms attached to the lower one of the APUs.

3. An aircraft as in claim 2, further comprising a rearward frame member extending downwardly and forwardly from a lower region of the support ring.

4. An aircraft as in claim 3, wherein the support arms have a forward end attached to the rearward frame member of the aircraft and a rearward end attached to the lower one of the APUs.

5. An aircraft as in claim 1, further comprising a firewall plate positioned between the APUs.

6. An aircraft as in claim 5, wherein the firewall plate is an inverted U-shaped plate.

7. An aircraft as in claim 5, further comprising an upper frame member attached generally at a center of the firewall plate.

8. An aircraft as in claim 1, further comprising a series of inverted U-shaped strake frame members positioned about a lower one of the APUs.

9. An aircraft comprising:
   a fuselage with a tail cone section,
   a pair of auxiliary power units (APUs) mounted in a parallel generally vertically adjacent manner relative to one another within the tail cone section
   a series of inverted U-shaped strake frame members positioned about a lower one of the APUs, and
   horizontal strake frame members attached to the inverted U-shaped strake frame members.

10. An aircraft as in claim 9, further comprising a firewall plate positioned between the APUs.

11. An aircraft as in claim 10, wherein the firewall plate is an inverted U-shaped plate.

12. An aircraft as in claim 10, further comprising an upper frame member attached generally at a center of the firewall plate.

13. An aircraft as in claim 1, wherein the fuselage includes a pair of downwardly and outwardly oriented strakes adjacent the tail cone having lower edges which establish a maximum take-off pitch angle of the fuselage, wherein the strakes define a spatial zone therebetween, and wherein the APUs are positioned within the spatial zone defined between the strakes.

* * * * *